ID

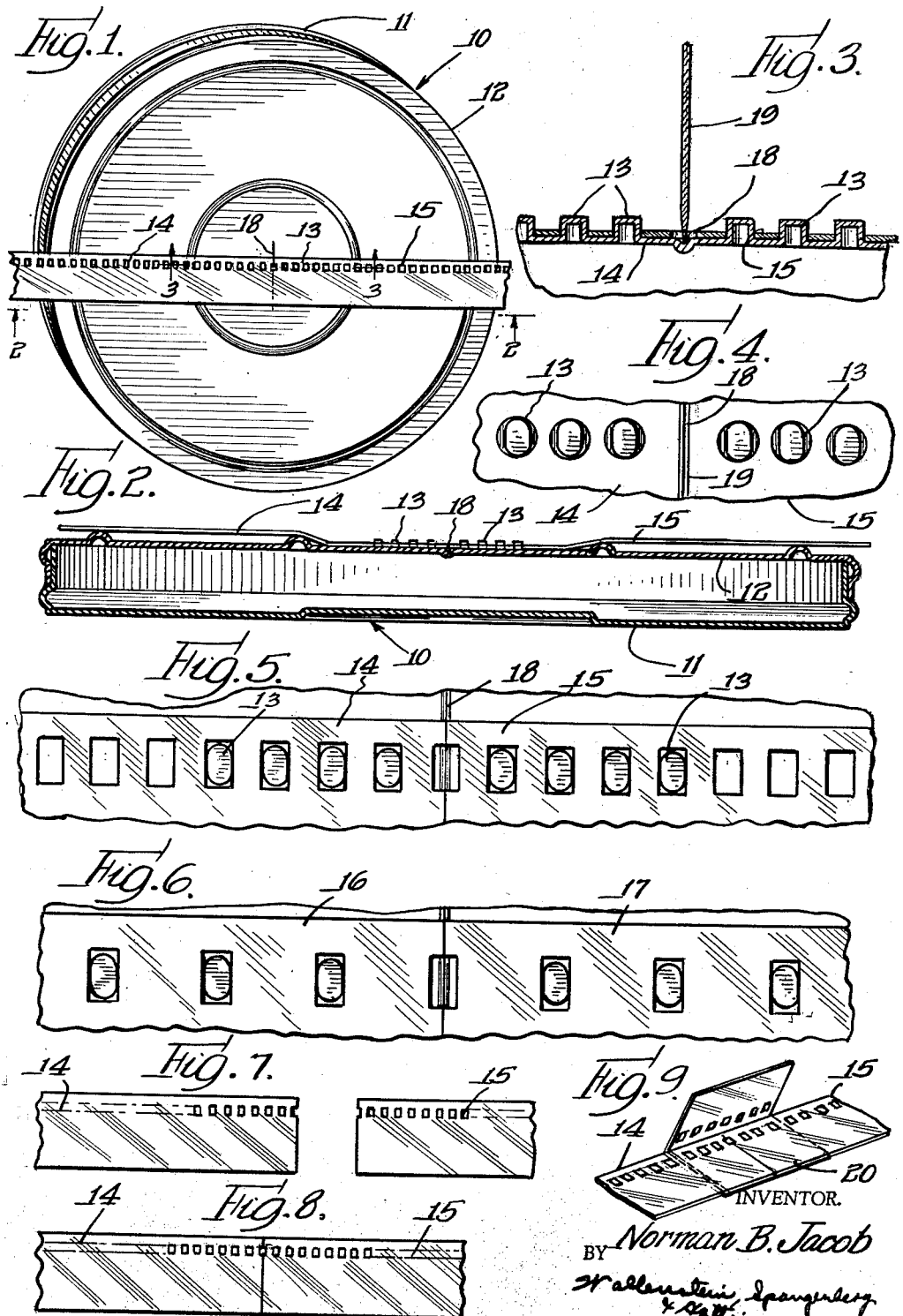

United States Patent Office 3,097,558
Patented July 16, 1963

3,097,558
COMBINATION FILM CAN AND SPLICER
Norman B. Jacob, Morton Grove, Ill., assignor to Keystone Ferrule & Nut Corp., Burlington, Wis., a corporation of Wisconsin
Filed Aug. 25, 1961, Ser. No. 133,900
8 Claims. (Cl. 83—648)

This invention relates to a film can, and in particular, to a movie film can having means provided thereon for butt splicing such film.

Butt splicing is an operation whereby the movie film strips to be spliced are trimmed through the center of a sprocket-receiving opening and are secured in end to end relation at such point. Conventionally this operation is performed in conjunction with film splicers having a number of moving parts, exemplified by U.S. Patent No. 2,923,195. Conventional film splicers have a number of disadvantages including the fact that they consitute a separate movie film accessory and they are usually priced at several dollars.

It is an object of this invention to provide in the same structure means for storing and butt splicing movie film thereby substantially eliminating the need for auxiliary butt splicing apparatus.

It is also an object of this invention to provide the combination of a conventional movie reel storage can with an integral movie film butt splicing portion of a simple, inexpensive structure having no movable parts and being adapted to retain and fixedly support film strips both during the trimming and the splicing operation, and which can be manufactured and sold at prices relatively little more than the cost of the conventional movie reel can itself.

It is still another object of this invention to provide in the same simple and convenient structure means for storing and butt splicing movie film, the film splicing portion of the structure permitting either the separate or the simultaneous trimming of the film strip ends.

It is another object of this invention to provide in the same structure means for storing and butt splicing movie film of any desired size.

These and other objects, advantages and features of the invention will become apparent upon making reference to the following description taken in conjunction with the drawings wherein:

FIG. 1 is a perspective view illustrating a film can with two strips of film mounted in position for splicing on the butt splicing means in the cover of the film can.

FIG. 2 is a sectional view taken along the line 2—2 of FIG. 1.

FIG. 3 is an enlarged sectional view taken along the line 3—3 of FIG. 1 showing a separate cutting edge trimming the ends of the film strips.

FIG. 4 is a plane view of the area of the splicing means illustrated in FIG. 3.

FIG. 5 is an enlarged plan view of the splicing means showing the arrangement of the sprocket hole receiving pins for 8 mm. film with two strips of such film mounted on the pins for splicing.

FIG. 6 is an enlarged plan view of the splicing means showing the arrangement of the sprocket hole receiving pins for 16 mm. film with two strips of such film mounted on the pins for splicing.

FIG. 7 is a plan view of two strips of film with trimmed ends prepared for splicing.

FIG. 8 is a plan view of the two strips of film illustrated in FIG. 7 abutting each other preparatory to forming a butt splice.

FIG. 9 is a perspective view of the trimmed ends of two film strips being butt spliced with splicing tape.

Referring now to the drawings for a more detailed explanation of the invention, my film container or can, designated generally at 10, comprises a body or movie film reel receiving section 11 and a lid or cover 12. The container 10 may be of conventional design and be constructed of any suitable material in any manner known to the art.

In the preferred embodiment of my invention illustrated in FIGS. 1 and 2, the lid 12 of the container 10 is provided with two groups of preferably substantially centrally positioned, spaced registration pins 13 which are adapted to engage with the sprocket-receiving openings of film strips 14 and 15. The pins 13 are preferably constructed of the same material as the lid 12 and are integral therewith. They should be of sufficient cross-sectional area and height to form rigid and secure supporting means for the engaged film strips, and may be of any suitable configuration.

The spacing of the pins 13 within the groups with respect to each other is dependent on the spacing of the sprocket-receiving openings of the film strips to be spliced. For example, in the case of the most popular home movie films, 8 mm. and 16 mm., the distance between the sprocket-openings of the 16 mm. film is double that of the sprocket openings of the 8 mm. film. Similar variations in the spacing of the sprocket-openings exist with respect to 35 mm. film and other sizes. My film container can be constructed to accommodate any desired film size for storage while providing means associated with the container for butt splicing such film.

In the embodiment of my invention illustrated in FIGS. 1 through 5, the pins 13 are spaced apart a distance suitable to receive the sprocket-openings of the strips 14 and 15 of 8 mm. film. FIG. 6 illustrates the pins 13 spaced apart a distance sufficient for splicing the strips 16 and 17 of 16 mm. film.

Substantially intermediate the two groups of pins 13 in the lid 12 there is provided an elongated groove or slit 18. The function of the groove 18 is to receive and guide a cutting edge 19 such, for example, as a knife blade or a razor blade. The groove 18 most advantageously does not penetrate completely the material of which the lid 12 is made. This feature prevents access to the film stored in the container 10 of air or air-borne contaminants.

The groove or slit 18 is so positioned with respect to the groups of pins 13 that the cutting edge 19 will pass through the center of a sprocket-receiving opening in each of the film strips to be trimmed for splicing, thereby providing complementary splicing ends in abutting relation ready for butt splicing. This is clearly illustrated in FIGS. 5, 6, 7 and 8.

The surface of the film can 10, which for the purposes of this invention may be either the upper surface of the lid 12 as described hereinabove, or the outer bottom surface of the section 11, having the butt splicing feature, provides an ample and excellent working surface for the splicing operation.

In utilizing my invention, a film strip 14 is mounted on one group of the pins 13 so that the end thereof to be trimmed extends beyond the groove 18. A cutting edge 19 is then guided along the groove 18 to trim or cut the edge of the strip 14. Similarly, a film strip 15 is mounted on the other group of the pins 13 opposite to the already trimmed strip 14. The cutting edge 19 is again guided along the groove 18 to trim the strip 15. More conveniently, the two film strips 14 and 15 may be trimmed simultaneously by placing the ends thereof in over-lapping relation and guiding the cutting edge 19 through the groove 18 in the manner described. The two strips thus trimmed present complementary splicing ends which are fixedly held and supported in abutting relation by the pins 13 preparatory to splicing.

The splice itself may be completed by utilizing any one of several pressure sensitive tapes now commercially available. An illustration of the use of such a tape 20 is shown in FIG. 9. By employing a number of registration pins, for example, four, as illustrated in FIGS. 1 and 2 of the drawings, in each group of pins on my film can, I have found that not only is the trimming and splicing of 8 mm. film, for example, greatly facilitated due to the more rigid and secure support provided thereby for the film strips, but the splicing operation itself can be performed with greater ease and efficiency due to the more effective support imparted to the splicing tape by the larger number of pins. In the case of splicing film strips of 16 mm. film, it is desirable that added support for the splicing tape employed in connection with such film be given by providing additional pins, not shown, on the film can suitably positioned, generally below the groups of disclosed film strip supporting registration pins to engage with one or more sprocket-receiving openings in the tape.

What I claim as new and desire to protect by Letters Patent of the United States is:

1. A film container comprising a film receiving section and a cover therefor, a surface of the container being provided with at least one group of aligned and spaced registration pins for engaging with sprocket-receiving openings in a film strip to be trimmed, the pins serving to fixedly support and position the film strip on the surface of the container for trimming, and means in the surface of the container for receiving and guiding a separate cutting edge, said means being so positioned with respect to the pins to enable the cutting edge to trim the film strip at a point substantially thorugh the center of one sprocket-receiving opening in the film strip.

2. A film container comprising a film receiving section and a cover therefor, a surface of the container being provided with two groups of aligned and spaced registration pins for engaging with sprocket-receiving openings in film strips to be trimmed and spliced, the pins serving to fixedly support and position in aligned relationship such film strips on the surface of the container, and means in the surface substantially intermediate the groups of registration pins for receiving and guiding a separate cutting edge, said means being so positioned with respect to the groups of pins to enable the cutting edge to trim simultaneously the film strips at a point substantially through the center of one sprocket-receiving opening of each of the film strips thereby to present complementary abutting trimmed ends of the film strips, the ends being adapted to be butt spliced together while the film strips are supported and positioned in aligned relationship by the pins on the surface of the container.

3. A film container comprising a film receiving section and a cover therefor, the outer surface of the cover being provided with two groups of aligned and spaced registration pins projecting from the surface for engaging with sprocket-receiving openings in film strips to be trimmed and spliced, the pins serving ot fixedly support and position in aligned relationship such film strips on the surface of the cover, and means in the cover, substantially intermediate the groups of registration pins, for receiving and guiding a separate cutting edge through the film strips to trim the ends thereof to thereby present complementary abutting trimmed ends of the film strips, the ends being adapted to be butt spliced together while the film strips are supported and positioned in aligned relationship by the pins on the surface of the cover.

4. A film container comprising a film receiving section and a cover therefor, the outer surface of the cover being provided with two groups of aligned and spaced registration pins projecting from the surface for engaging with sprocket-receiving openings in film strips to be trimmed and spliced, the pins serving to fixedly support and position in aligned relationship such film strips on the surface of the cover, and a groove in the cover substantially intermediate the groups of registration pins for receiving and guiding a separate cutting edge through the film strips to trim the ends thereof to thereby present complementary abutting trimmed ends of the film strips, the ends being adapted to be butt spliced together, while the film strips are supported and positioned in aligned relationship by the pins on the surface of the cover.

5. A film container comprising a film receiving section and a cover therefor, the outer surface of the cover being provided with two groups of aligned and spaced registration pins integral with and projecting from the surface for engaging with sprocket-receiving openings in film strips to be trimmed and spliced, the pins serving to fixedly support and position in aligned relationship such film strips on the surface of the cover, and a groove in the surface of the cover, but not penetrating the cover, substantially intermediate the groups of registration pins for receiving and guiding a separate cutting edge, the groove being so positioned with respect to the groups of pins to enable the cutting edge to trim the film strips at a point substantially through the center of one sprocket-receiving opening in each of the strips to thereby present complementary abutting trimmed ends of the film strips, the ends being adapted to be butt spliced together while the film strips are supported and positioned in aligned relationship by the pins on the surface of the cover.

6. A film container for receiving a reel of movie film comprising a movie film reel receiving section and a cover therefor, the outer surface of the cover being provided with two groups of aligned and spaced registration pins integral with and projecting from the surface for engaging with sprocket-receiving openings in film strips to be trimmed and spliced, the pins serving to fixedly support and position in aligned relationship such film strips on the surface of the cover, and an elongated groove of narrow dimensions in the surface of the cover, but not extending into the interior of the film container, substantially intermediate the groups of registration pins for receiving and guiding a separate cutting edge, the groove being so positioned with respect to the groups of pins to enable the cutting edge to trim the film strips at a point substantially through the center of one sprocket-receiving opening in each of the strips to thereby present complementary abutting trimmed ends of the film strips, the ends being adapted to be butt spliced together while the film strips are supported and positioned in aligned relationship by the pins on the surface of the cover.

7. A film container for receiving a reel of movie film comprising a movie film reel receiving section and a cover therefor, a surface of the container being provided with two groups of aligned and spaced registration pins formed from and integral with the material of which the surface is made and projecting from the surface for engaging with sprocket-receiving openings in movie film strips to be trimmed and spliced, the pins serving to fixedly support and position in aligned relationship such film strips on the surface, and a groove in the surface, but not penetrating into the interior of the film container, substantially intermediate the groups of registration pins for receiving and guiding a separate cutting edge, the groove being so positioned with respect to the groups of pins to enable the cutting edge to trim the film strips at a point substantially through the center of one sprocket-receiving opening in each of the strips to thereby present complementary abutting trimmed ends of the film strips, the ends being adapted to be butt spliced together while the film strips are supported and positioned in aligned relationship by the pins on the surface.

8. A film container for receiving a reel of movie film comprising a movie film reel receiving section and a cover therefor, the outer surface of the cover being provided substantially centrally thereof with two groups of aligned and spaced registration pins formed from and integral with the material of the cover and projecting from the surface of the cover for engaging with sprocket-receiving openings in movie film strips to be trimmed and spliced, the pins serving to fixedly support and position in aligned relationship such film strips on the surface of the cover, and a groove in the surface of the cover, but not penetrating the cover, substantially intermediate the groups of registration pins for receiving and guiding a separate cutting edge, the groove being so positioned with respect to the groups of pins to enable the cutting edge to trim the film strips at a point substantially through the center of one sprocket-receiving opening in each of the strips to thereby present complementary abutting trimmed ends of the film strips, the ends being adapted to be butt spliced together while the films strips are supported and positioned in aligned relationship by the pins on the surface of the cover.

References Cited in the file of this patent

UNITED STATES PATENTS

| | | |
|---|---|---|
| 1,781,200 | Spiros | Nov. 11, 1930 |
| 2,923,195 | Reibel | Feb. 2, 1960 |